UNITED STATES PATENT OFFICE.

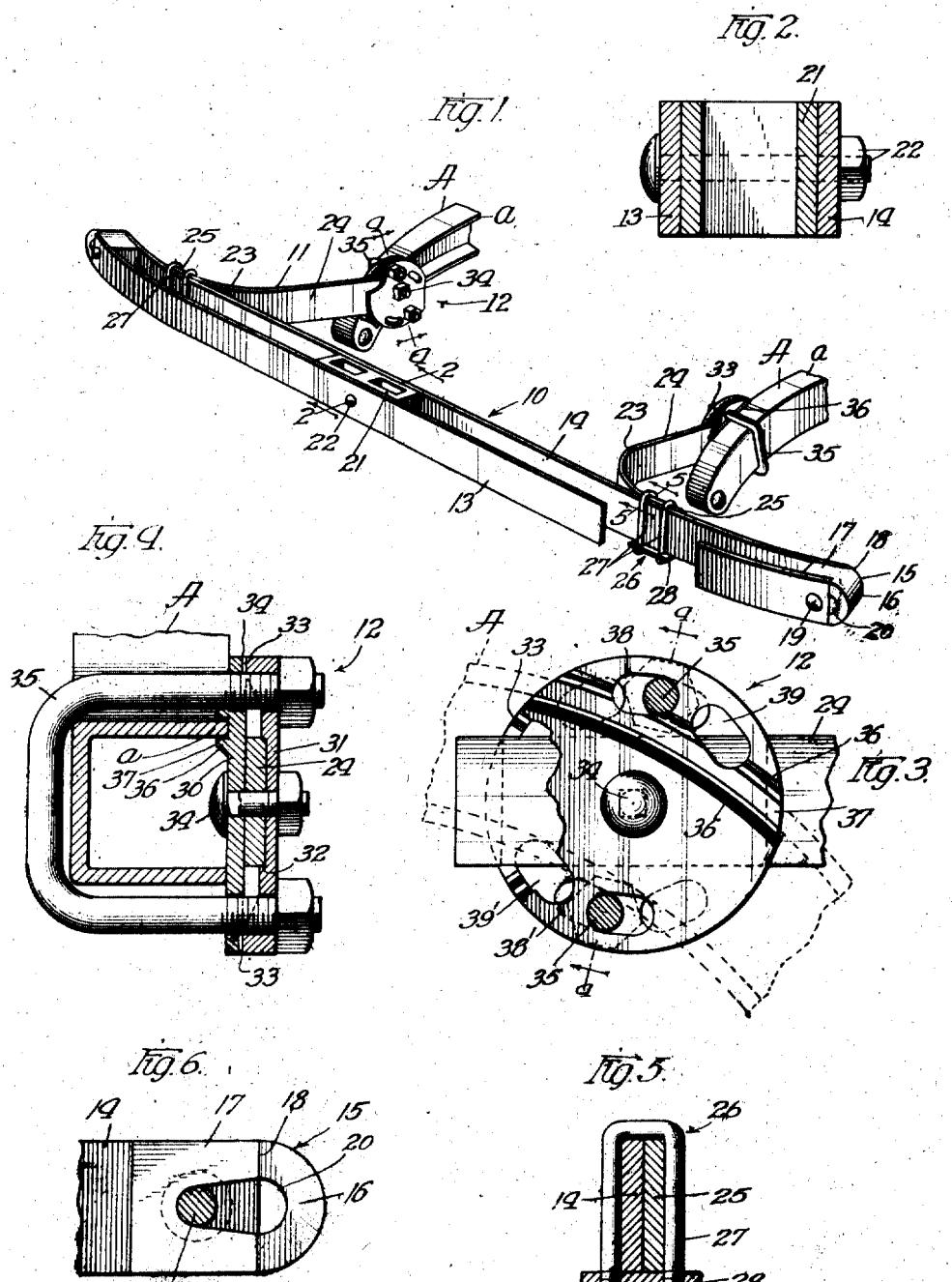

EDWARD PARRADEE, OF CHICAGO, ILLINOIS.

AUTOMOBILE-BUMPER.

1,245,015.   Specification of Letters Patent.   Patented Oct. 30, 1917.

Application filed January 31, 1917. Serial No. 145,636.

*To all whom it may concern:*

Be it known that I, EDWARD PARRADEE, a citizen of the United States, residing at Chicago, in the county of Cook and State of Illinois, have invented certain new and useful Improvements in Automobile-Bumpers, of which the following is a specification.

My invention relates to automobile bumpers, and has for its general objects to provide a bumper of adequate strength to withstand severe shocks without damage to the car or to itself; of ample resiliency to absorb shocks with communication of only minimal strain or jar to the car and consequently minimize the liability to damage the car; of light weight; of few parts for cheap and easy manufacture, or repair and replacement of parts; of attractive appearance; and of structure easily applied to and readily adjusted to fit automobiles of many different makes.

The features of construction and correlation of parts constituting my present invention as pointed out in the appended claims and set forth in the specification, may find one appropriate embodiment in the construction specifically shown in the drawings, wherein—

Figure 1 is a perspective view of the bumper applied to the front end of a motor car frame.

Fig. 2 is a section on line 2—2 of Fig. 1.

Fig. 3 is a side elevation of an attaching means.

Fig. 4 is a section therethrough on line 4—4 of Fig. 1.

Fig. 5 is a section on line 5—5 of Fig. 1; and

Fig. 6 is a detail elevation of a spacer.

The bumper in general comprises the bar 10, supports 11 attached thereto and running rearwardly to the frame A of the car, and attaching means 12 to connect the arms to the frame.

The bar 10, as shown herein, comprises two spring-steel leaves 13 and 14, rather deep and thin, arranged edge-down, spaced one behind the other in approximate parallelism, and connected together solidly at both ends and at one or more intermediate points, through spacing blocks so that in plan the bar,—that is straight across its center span and curving rearwardly at its ends in usual shape—forms a plurality of cells or chambers, open at top and bottom, rigidly closed at their ends and bounded front and rear by the deep thin leaves.

The end spacers 15 are preferably castings, with rounded or ornamentally shaped heads 16 that project beyond the bar-leaves, and with rectangular necks 17, reduced in width so that the leaves fit against the neck-sides and butt against shoulders 18, each spacer being secured in place by a bolt 19 extending through its neck and through bolt-holes in the leaf ends. For lightness the casting may be cored out horizontally, as at 20, from the bolt hole to near the crown of the head so that the spacer is really positioned by the bolt and the shoulders bearing against the leaf ends, conjointly. The intermediate spacer casting 21, (a single central one being shown though more may be used) is a vertically-cored block fitted between the leaves and secured by a through bolt 22. This "cellular" form of bar I find to be most advantageous as each leaf in its free span between spacers has material individual springiness yielding to even a rather light pressure without materially affecting the other leaf, and yet, by reason of the solid connection between the leaves, any larger distortion of either leaf can be secured only by an accommodating minor distortion of the other leaf, so that shocks are materially absorbed within the structure of the bar itself in the expenditure of force to distort one leaf from parallelism with the other.

The full benefit of this construction is secured by mounting the bar on the supports 11 at points local to one bar-leaf and in the resilient spans of said leaf between spacers, and the arm supports themselves preferably may be made resilient.

Specifically, therefore, the supports 11 are preferably made of spring steel, each of the same depth as the bar-leaves and of appropriate thickness, each bent as at 23 on a spring-curve from a leg 24 extending straight rearwardly to a foot 25 paralleling the bumper bar, and each foot is secured directly to the rear leaf of the bar at a point intermediate two spacers. A clamp 26 comprising two U-bolts 27, each embracing the bar-leaf and the foot, and all passing through a bottom plate 28, serves most effectively to secure the bar on the supports rigidly yet adjustably so that the supports may be spaced apart according to the requirements of the car on which the bumper is to be mounted.

Each support is of course an independent spring yieldable under severe shocks to accommodate displacement of either end of the bar or the bar as a whole and the coordinated bar and supports constitute a very effective shock-absorbing structure.

While various attaching means may be employed to connect the supports with the car, it is highly desirable that the two attaching means on the respective supports shall fit cars of different frame-designs, shall be duplicated in construction and shall give some range of adjustment to enable the supports to be disposed horizontally or to place the bar at just the desired elevation. Each attaching means 12, as shown, comprises two circular plates 30 and 31, the latter channeled as at 32 to receive the leg 24 of the support and provided with a border of crown-teeth 33 to mesh with teeth 34 bordering the plate 30 and disposed with their crowns in the plane of the outer face of supporting leg 24. These two plates are centrally secured together and to the leg 24 by a bolt 34, and are further secured together and to the car-frame by a U-clip 35. The down-bending horn of frame A (common in many makes of cars) is of channeled form in cross section providing interiorly an arcuate edge $a$ and on the outer face of plate 30 I provide lips 36 including therebetween a groove 37 to receive such edge $a$. Identical plates 30 will fit both the right and left frame members but the reversal of position of said plate to accommodate such right-and-left attachment necessitates that the U-bolt 35 which embraces the frame and engages the plates shall take different positions relative to the plates, wherefore I form in each plate two pairs of bolt receiving openings 38, 38' and 39, 39' symmetrically disposed with respect to the crest of the arc of lips 36 on plate 30. Each of these holes I preferably elongate on an arc to give some leeway for adjustment of the position of supports 11 with respect to the car-frame or to the plate 30 rib-positioned on the frame. The firm and adequate attachment of support 11 to frame A thus provided develops substantially the full strength of the supports and insures that shocks to the bar will not displace the fastened ends of the supports, thereby enabling the resilient portions of the structure to develop their full shock-absorbing qualities.

While I have herein described in some detail a particular construction embodying my invention, for purposes of full disclosure thereof, it will be apparent to those skilled in the art that many variations may be made in detail within the spirit of my invention and within the scope of the appended claims.

Having described my invention, what I claim is:—

1. In a bumper, the combination of a bar, supporting means therefor and means for attaching said supporting means to a car frame comprising a pair of plates positioned at opposite sides of the supporting means, one receiving the supporting means, and the other plate having projections for engagement with the car frame, said plates having interlocking teeth and registering openings and means engaging said openings for securing the plates to a car-frame.

2. In a bumper the combination of a bar, supporting means therefor and means for attaching said supporting means to a car frame comprising a pair of plates, one receiving the supporting means, and the other having a groove formed in its outer face for engagement with an edge of the car frame, said plates having interlocking teeth and registering openings, a bolt passing through the centers of the plates and through the support and means engaging said openings for securing the plates to a car-frame.

3. In a bumper the combination of a bar, supporting means therefor and means for attaching said supporting means to a car frame at a portion lying at an angle to the supporting means comprising a pair of plates, one receiving the supporting means, and the other plate having projections for engagement with the car frame, said plates having interlocking teeth and a plurality of pairs of oppositely positioned openings spaced apart circumferentially and means engaging any pair of opposite openings for securing the plates to either side of a car-frame.

In testimony whereof I hereunto set my hand.

EDWARD PARRADEE.